Feb. 13, 1923.
D. B. ORSHAL
MITERING MACHINE
Filed June 23, 1921
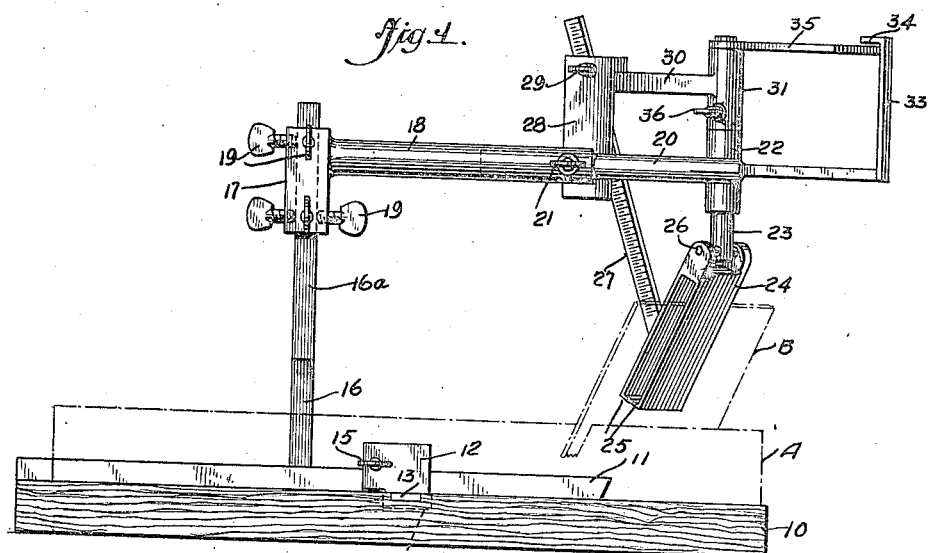
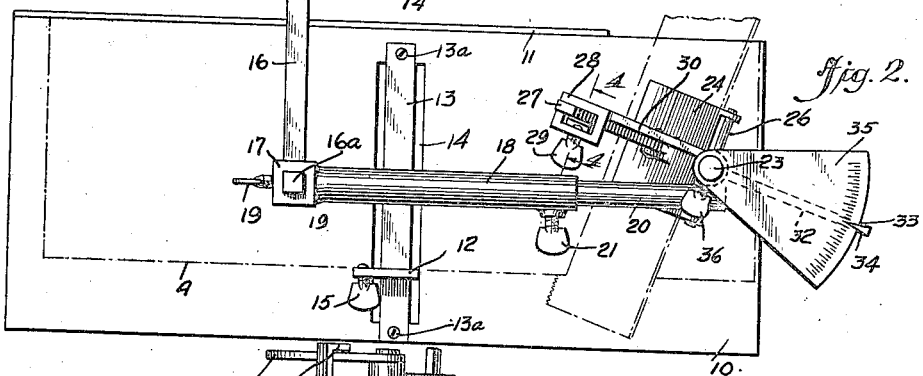
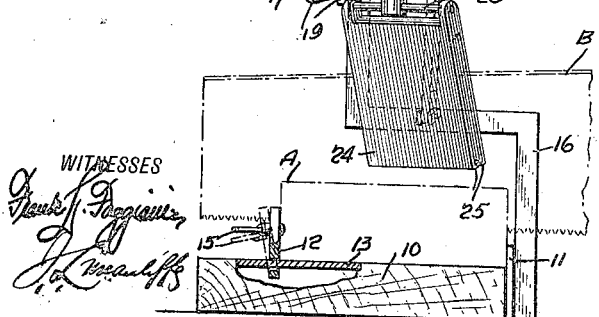
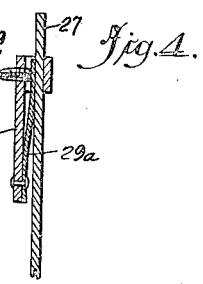
INVENTOR
D. B. ORSHAL
BY
ATTORNEYS Patented Feb. 13, 1923.

1,445,547

UNITED STATES PATENT OFFICE.

DAVID BRAINARD ORSHAL, OF CARLISLE, PENNSYLVANIA.

MITERING MACHINE.

Application filed June 23, 1921. Serial No. 479,802.

*To all whom it may concern:*

Be it known that I, DAVID BRAINARD ORSHAL, a citizen of the United States, and a resident of Carlisle, in the county of Cumberland and State of Pennsylvania, have invented a new and Improved Mitering Machine, of which the following is a full, clear, and exact description.

My invention relates to a machine for use in cutting miters and has for its object to provide a novel saw guide and means to variously adjust the saw guide to cut miters at different angles with convenience and with precision.

The invention also has for an important object to provide for optionally adjusting the saw guide to produce a bevel of any desired angle in the miter.

The nature of the invention and its distinctive features and advantages will clearly appear as the description proceeds.

Reference is to be had to the accompanying drawings forming a part of this specification, it being understood that the drawings are merely illustrative of one example of the invention.

Figure 1 is a side elevation of a machine embodying my invention.

Figure 2 is a plan view thereof.

Figure 3 is an end view, a portion of the base being broken away to better show the work clamping means, and Figure 4 is a detail in transverse vertical section on the line 4—4 of Figure 2.

In carrying out my invention in accordance with the illustrated example, I provide a base 10, on which the work may be placed, said base having along a side thereof a member 11 rising above the surface of the base, against which the work may be laid. To clamp the work against the member 11, I provide a clamping dog 12 transversely slidable on a guide plate secured by screws 13ª over a depression 14 in the base, the said dog slidably engaging the bar 13 so as to rock at a slight angle to the vertical, indicated in dotted lines in Figure 3, and causing the dog to bind on the said bar. The dog 12 has a clamp screw 15 to bear against the piece of work indicated in dotted lines at A in Figures 1 to 3, to firmly clamp the work against the member 11.

A standard 16 is secured to and rises from the base 10 advantageously at that side forming the member 11, and said standard is offset laterally inward so that its vertical end 16ª overlies the base and the work A. The upstanding end 16ª of the standard 16 receives a sleeve 17, the sleeve and standard being preferably rectangular. Set screws 19 in suitable number are provided on the sleeve to hold it in a given vertical adjustment on the standard. Said sleeve 17 is rigid with a horizontal arm 18 having a telescoping section 20 held in given adjustment by a set screw 21 or the like.

The telescoping section 20 of arm 18 is formed with a vertical sleeve 22 culminating in a vertical spindle 23 which carries at its lower end a saw guide 24 which is thus adapted to be disposed above the work A, for guiding the saw B indicated at B, at the desired angle in cutting a given miter. The saw guide 24 is turnable with the spindle 23 about the vertical axis of the latter, and also it is swingably mounted on the spindle by a transverse hinge pin 26 whereby the saw guide may not only be disposed so as to cut the miter at a given angle but also to bevel the miter at any desired angle. The said saw guide 24 has spaced sides, the lower ends of which have flanges 25 directed laterally inward toward each other and separated to present a slot for the saw B.

For swinging the saw guide 24 on its hinge pin 26 for giving a particular bevel to the miter, I provide a graduated element 27 pivotally connected at its lower end with said saw guide, said bar extending obliquely upward to a clamp 28 having a set screw 29 operating against a plate spring 29ª in said socket to press said spring against said bar 27. The socket 28 is carried at the outer end of a horizontal arm 30 on a sleeve 31 fitting the spindle 23 above the sleeve 22 and resting on the latter. At an angle to the arm 30 extends a horizontal arm 32, the outer end of which forms an upstanding member 33 terminating at its upper end in an indicating pointer 34 directed laterally inward and overlying a graduated sector 35 rigid with the spindle 23 above the sleeve 31.

With the above described arrangement, the degree of turning of the spindle 23 and the saw guide 24 about the axis of said spindle will be indicated by the sector 35 of pointer 34. The adjustment of the saw guide 24 for cutting a miter at a given bevel will be indicated by the graduations on the bar 27. A set screw 36 is provided to hold the sleeve 31 and spindle 23 against relative turning to thereby lock the saw guide 24 at an angle for cutting a given miter, while the set screw 29 secures the saw guide for cutting the miter at a given bevel.

I would state in conclusion that while the illustrated example constitutes a practical embodiment of my invention, I do not limit myself strictly to the mechanical details herein illustrated, since manifestly the same can be considerably varied without departing from the spirit of the invention as defined in the appended claims.

Having thus described my invention, I claim:

1. A mitering machine including a saw guide, and means swingingly suspending said guide from its upper end to afford clearance for work therebeneath, and means associated with said first means for permitting a manual turning of said guide on an approximately vertical axis, adjacent the guide and on an axis remote from said first mentioned axis.

2. In a mitering machine of the character described, a standard, a sleeve provided with a telescoping arm slidably mounted on said standard, a second sleeve providing a pair of oppositely disposed arms secured to the telescoping section of said arm, a member slidably held in said sleeve, a guide swingably carried by the lower end of said member, a graduated element attached to the lower end of said guide and extended adjacent one of said last mentioned arms, means on said arm for clamping said element, and a further graduated element secured to the upper end of said member and rotatable therewith.

3. A mitering machine including a base having means to hold the work thereon, a standard on said base, an approximately horizontal arm on said standard, said arm being adjustable on said standard both vertically and horizontally, a spindle supported on said arm to turn about an approximately vertical axis, a saw guide swingingly carried by said spindle at its lower end to partake of the turning movement of the spindle and means to hold the spindle and saw guide against turning.

4. A mitering machine including a base having means to hold the work thereon, a standard on said base, a telescoping horizontal arm on said standard, said arm being adjustable to be disposed in different horizontal angular positions with respect to the base, a spindle supported on said arm to turn about an approximately vertical axis, a saw guide carried by said spindle at its lower end to partake of the turning movement of the spindle, said saw guide having a hinge connection with the spindle to swing laterally for producing a beveled miter, optionally operable adjustable means to variously swing the saw guide, means to hold the spindle against turning, and means to hold said adjusting means with the saw guide in a given position.

5. A mitering machine including a standard, a sleeve vertically adjustable on the standard, a horizontal arm rigid with said sleeve and having a telescoping section, a vertical sleeve rigid with said telescoping section, a spindle turnable in said vertical sleeve, a saw guide suspended on the lower end of said spindle, a second sleeve on the spindle, an indicating pointer rigid with said second sleeve, a graduated indicating element fixed on said spindle to turn thereby relatively to the pointer and means to lock said second sleeve and spindle against relative turning.

6. A mitering machine of the class described including a telescopic horizontal arm, means to adjustably support said arm, a sleeve on said arm, a spindle turnable in said sleeve, a saw guide carried by said spindle at its lower end to partake of the turning movement thereof, said saw guide being laterally swingable on the spindle, a graduated adjusting bar pivotally connected at its lower end with said saw guide, a second sleeve on the spindle and a clamp supported on said sleeve and adapted to adjustably clamp the said graduated bar.

DAVID BRAINARD ORSHAL.